United States Patent
Bae

(10) Patent No.: US 8,625,443 B2
(45) Date of Patent: Jan. 7, 2014

(54) SYSTEM FOR MEASURING TRANSMISSION BANDWIDTH FOR MEDIA STREAMING AND METHOD FOR SAME

(75) Inventor: Tae Meon Bae, Daegu (KR)

(73) Assignee: SK Planet Co., Ltd., Seoul (KR)

( * ) Notice: Subject to any disclaimer, the term of this patent is extended or adjusted under 35 U.S.C. 154(b) by 358 days.

(21) Appl. No.: 12/922,379

(22) PCT Filed: Jun. 15, 2009

(86) PCT No.: PCT/KR2009/003188
§ 371 (c)(1),
(2), (4) Date: Sep. 13, 2010

(87) PCT Pub. No.: WO2010/024521
PCT Pub. Date: Mar. 4, 2010

(65) Prior Publication Data
US 2011/0007660 A1    Jan. 13, 2011

(30) Foreign Application Priority Data
Aug. 26, 2008 (KR) .................. 10-2008-0083266

(51) Int. Cl.
*H04L 12/26* (2006.01)
(52) U.S. Cl.
USPC ............ 370/252; 370/229; 370/230; 370/235
(58) Field of Classification Search
USPC .................................. 370/229–241, 252–253
See application file for complete search history.

(56) References Cited

U.S. PATENT DOCUMENTS

| | | | |
|---|---|---|---|
| 2004/0228284 A1* | 11/2004 | Tuinstra | 370/252 |
| 2005/0076136 A1 | 4/2005 | Cho et al. | |
| 2005/0097217 A1* | 5/2005 | Val et al. | 709/233 |
| 2006/0045023 A1* | 3/2006 | Kim et al. | 370/252 |
| 2007/0242616 A1* | 10/2007 | Chang et al. | 370/252 |
| 2007/0253445 A1* | 11/2007 | Lee | 370/468 |
| 2008/0151771 A1* | 6/2008 | Dowse | 370/252 |
| 2011/0149763 A1* | 6/2011 | Bae | 370/252 |

FOREIGN PATENT DOCUMENTS

| | | |
|---|---|---|
| JP | 2003-249960 | 9/2003 |
| KR | 10-0640492 | 10/2006 |
| KR | 10-0657608 | 12/2006 |
| WO | 03/065683 | 8/2003 |
| WO | 2004/088858 | 10/2004 |

OTHER PUBLICATIONS

International Search Report for PCT/KR2009/003188.
Supplementary European Search Report for 09810126 dated May 7, 2012.
Japanese Office Action for 2011-524886 dated Nov. 2, 2012.

* cited by examiner

*Primary Examiner* — Charles C Jiang
(74) *Attorney, Agent, or Firm* — Lowe Hauptman & Ham, LLP

(57) ABSTRACT

A system for measuring a transmission bandwidth for media streaming and a method thereof that are capable of calculating the transmission bandwidth by using a transmission packet to be transmitted to a receiver without transmitting a proving packet to the receiver and streaming media data to a receiver by using the transmission bandwidth in a service for streaming the media data such as a moving picture in real time.

19 Claims, 4 Drawing Sheets

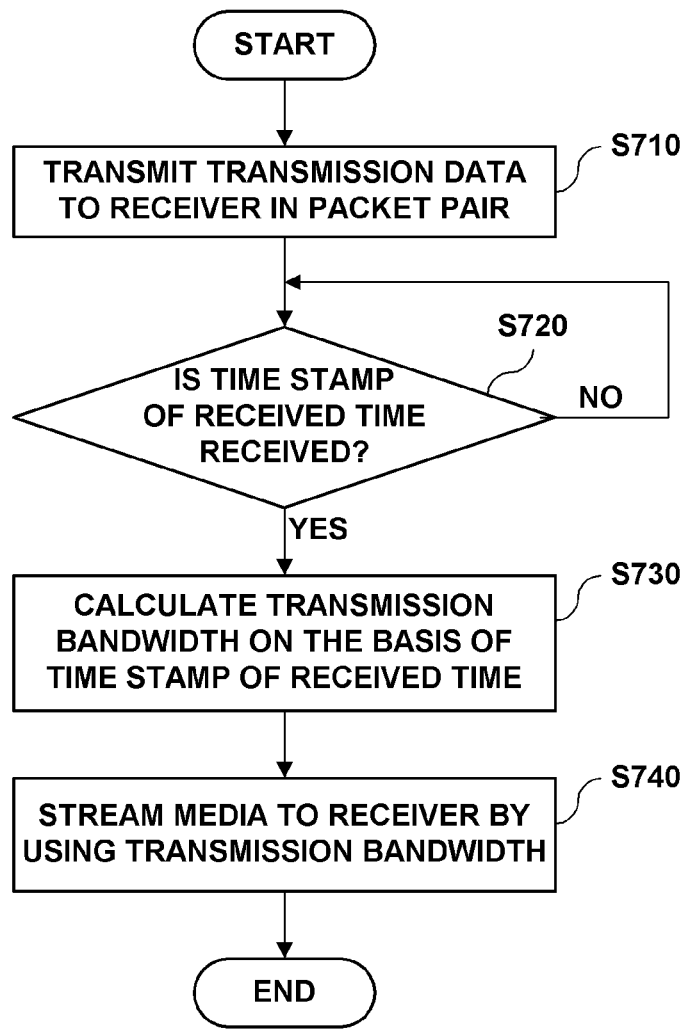

SYSTEM FOR MEASURING TRANSMISSION BANDWIDTH FOR MEDIA STREAMING AND METHOD FOR SAME

CROSS REFERENCE TO RELATED APPLICATION

This application claims the priority of Korean Patent Application No. 10-2008-0083266, filed on Aug. 26, 2008 in the KIPO (Korean Intellectual Property Office), the disclosure of which are incorporated herein in their entirety by reference. Further, this application is the National Phase application of International Application No. PCT/KR2009/003188, filed Jun. 15, 2009, which designates the United States and was published in English. Each of these applications is hereby incorporated by reference in their entirety into the present application.

BACKGROUND OF THE INVENTION

1. Field of the Invention

The present invention relates to a system for measuring a transmission bandwidth for media streaming and a method thereof, and more particularly, to a system for measuring a transmission bandwidth for media streaming and a method thereof that are capable of calculating the transmission bandwidth by using a transmission packet to be transmitted to a receiver without transmitting a proving packet to the receiver and streaming media data to a receiver by using the transmission bandwidth in a service for streaming the media data such as a moving picture in real time.

2. Description of the Related Art

In general, Internet transmits and receives data in the unit of a packet. At this time, a transmission bandwidth between two terminals that communicate with each other is not always ensured but if a path is selected, data is transmitted and received while dynamically occupying the bandwidth in the unit of each packet.

Due to such a network characteristic, a call quality is not ensured at predetermined level and the packet is lost or delayed depending on Internet conditions, thus, the call quality may be deteriorated. As Internet supply is spread, the performance or capacity of a network system itself is improved and an environment where Internet is connectable is also increased.

However, in spite of a situation where a demand for the capacity of a network bandwidth is rapidly increased with an increase in the number of Internet users and the number of real-time media communication applications, a bandwidth enough to deal with the real-time communication application is not substantially easy to ensure.

Further Internet cannot continuously occupy a bandwidth required during call connection due to characteristics of the network. Therefore, a bandwidth usable during call or depending on a call time is rapidly changed. A bandwidth approximately 5 to 10 times larger than a voice call is required to transmit and receive video data comparatively more than voice data in a good quality and if this condition is not satisfied, a video call quality may remarkably be deteriorated.

A function to control the bandwidth is very important in a video call and in general, a video terminal previously determines a bandwidth to be used before the call and can transmit and receive a video in accordance with the bandwidth. However, it is difficult to deal with a bandwidth which dynamically varies during the call by the above scheme.

FIG. 1 is a diagram for describing a known method for measuring a transmission bandwidth.

Referring to FIG. 1, a server transmits two or more proving packets to a receiver (S110).

At this time, the server transmits a proving packet including information on a transmission time to the receiver.

The receiver receives the proving packet including the transmission time information and acquires a reception interval between the two received packets and thereafter, calculates the transmission bandwidth as shown in Equation 1 on the basis of the reception interval (S120).

In addition, the receiver transmits the calculated transmission bandwidth to the server (S130).

Therefore, the server streams media by using the transmission bandwidth received from the receiver (S140).

That is, as shown in FIG. 2, the known transmission bandwidth measuring method requires a process in which the proving packet is transmitted from the server to the receiver separately from the transmission data for verification.

Further, since the proving packet is transmitted separately from the transmission data, the transmission bandwidth is additionally occupied by the proving packet.

SUMMARY OF THE INVENTION

In order to solve the above-mentioned problem, an object of the present invention is to provide a system for measuring a transmission bandwidth for media streaming and a method thereof that are capable of calculating the transmission bandwidth by using a transmission packet to be transmitted to a receiver without transmitting a proving packet to the receiver and streaming media data to a receiver by using the transmission bandwidth in a service for streaming the media data such as a moving picture in real time.

In order to achieve the above-mentioned object, according to an embodiment of the present invention, a system for measuring a transmission bandwidth includes: a server that transmits transmission data to a receiver in a packet pair and receives a time stamp of a received time when the transmission data is received from the receiver, calculates the transmission bandwidth on the basis of the time stamp of the received time, and streams media to the receiver by using the transmission bandwidth; and a receiver that receives the transmission data, records the time stamp of the received time for each packet of the received transmission data, transmits the time stamp of the received time recorded at a predetermined cycle and thereafter, receives media from the server through streaming.

Further, the server stores the packet size and a time stamp of a transmitted time of the transmission data, which correspond to each packet.

In addition, the server calculates the transmission bandwidth by dividing the sizes of two continuously sent i-th packets by a reception interval between two packets received in the receiver.

Moreover, the server acquires a final transmission bandwidth by taking a median for a set of transmission bandwidth values measured between the packet pairs in each cycle.

Meanwhile, in order to achieve the above-mentioned object, according to another embodiment of the present invention, a server includes: a communicator for communicating with a receiver; a data transmitter that transmits transmission data to the receiver in a packet pair; a bandwidth calculator that calculates the transmission bandwidth on the basis of a time stamp of a received time received from the receiver; and a controller that controls to transmit the transmission data through the data transmitter in a packet pair, calculate the transmission bandwidth through the bandwidth calculator on the basis of the time stamp of the received time received from the receiver, and stream media to the receiver by using the calculated transmission bandwidth.

Further, the server further includes a storage that stores the packet size and a time stamp of a transmitted time of the transmission data, which correspond to each packet.

In addition, the bandwidth calculator calculates the transmission bandwidth by dividing the sizes $L_i$ of two continuously sent i-th packets by a reception interval $tr_{i+1}-tr_i$ between two packets received in the receiver.

Moreover, the bandwidth calculator acquires a final transmission bandwidth by taking a median for a set of transmission bandwidth values measured between packet pairs in each cycle.

Meanwhile, in order to achieve the above-mentioned object, according to yet another embodiment of the present invention, a receiver includes: a received time storage that records and stores a time stamp of a received time for each packet of transmission data received from the server; and a controller that controls to transmit the time stamp of the received time for each packet of the transmission data to the server at a predetermined cycle.

In addition, the controller transmits the time stamp of the received time to the server at the predetermined cycle and thereafter, receives media transmitted from the server by using the transmission bandwidth acquired based on the time stamp of the received time through streaming.

Meanwhile, in order to achieve the above-mentioned object, according to still another embodiment of the present invention, a method for measuring a transmission bandwidth of a system including a server and a receiver includes: (a) allowing the server to transmit transmission data to the receiver in a packet pair; (b) allowing the receiver to receive the transmission data and transmit a time stamp of a received time of the received transmission data to the server; (c) allowing the server to receive the time stamp of the received time and calculate the transmission bandwidth on the basis of the time stamp of the received time; and (d) allowing the server to stream media to the receiver by using the transmission bandwidth.

Further, at step (b), the receiver records the time stamp of the received time for each packet of the transmission data and transmits the time stamp of the received time recorded at a predetermined cycle to the server.

In addition, at step (c), the server calculates the transmission bandwidth by dividing the sizes $L_i$ of two continuously sent i-th packets by a reception interval $tr_{i+1}-tr_i$ between two packets received in the receiver.

Moreover, at step (c), a final transmission bandwidth is acquired by taking a median for a set of transmission bandwidth values measured between the packet pairs in each cycle.

Meanwhile, in order to achieve the above-mentioned object, according to still another embodiment of the present invention, a method for measuring a transmission bandwidth of a server streaming media to a receiver by using the transmission bandwidth includes: (a) transmitting transmission data to the receiver in a packet pair; (b) receiving a time stamp of a received time of the transmission data from the receiver; and (c) calculating the transmission bandwidth on the basis of the time stamp of the received time.

Further, at step (b), the time stamp of the received time of the transmission data is received from the receiver at a predetermined cycle.

In addition, at step (c), the transmission bandwidth is calculated by dividing the sizes $L_i$ of two continuously sent i-th packets by a reception interval $tr_{i+1}-tr_i$ between two packets received in the receiver.

Moreover, at step (c), a final transmission bandwidth is acquired by taking a median for a set of transmission bandwidth values measured between the packet pairs in each cycle.

In addition, the method may further include (d) streaming media to the receiver by using the calculated transmission bandwidth.

According to an embodiment of the present invention, it is possible to actually measure a transmission bandwidth by using transmission data without using a proving packet.

Further, it is possible to prevent the loss of the bandwidth by an additional proving packet and efficiently stream media such as a moving picture, etc. in accordance with the bandwidth.

In addition, as the media is streamed in accordance with the transmission bandwidth, it is possible to provide a service satisfying a quality of service (QoS).

BRIEF DESCRIPTION OF THE DRAWINGS

FIG. 7 is an operational flowchart for describing a method for measuring a transmission bandwidth of a streaming server according to an embodiment of the present invention.

DETAILED DESCRIPTION OF THE PREFERRED EMBODIMENTS

A matter regarding to a configuration and an effect of the present invention will be appreciated clearly through the following detailed description with reference to the accompanying drawings illustrating preferable embodiments of the present invention. Hereinafter, embodiments in accordance with the present invention will be described in detail with reference to the accompanying drawings.

Figure 1:
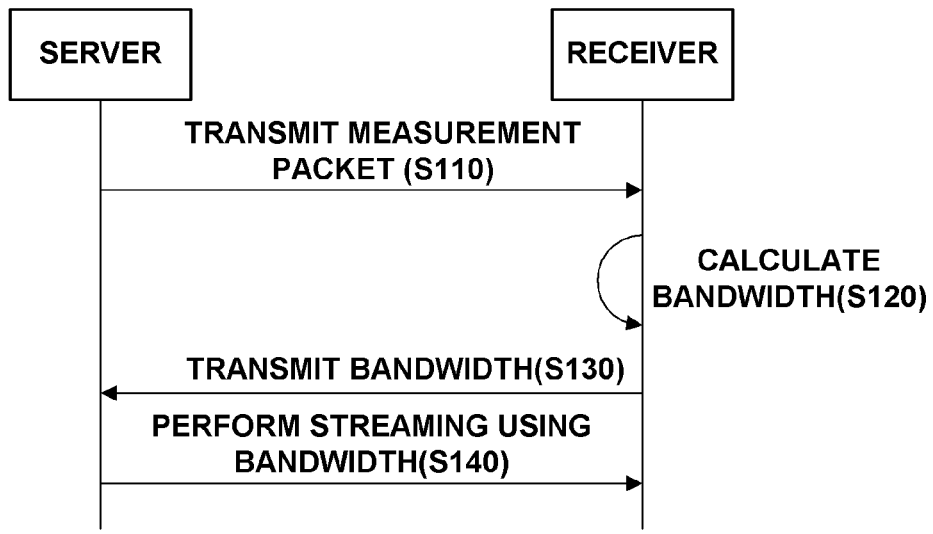
FIG. 1 is a diagram for describing a known method for measuring a transmission bandwidth.
Figure 2:
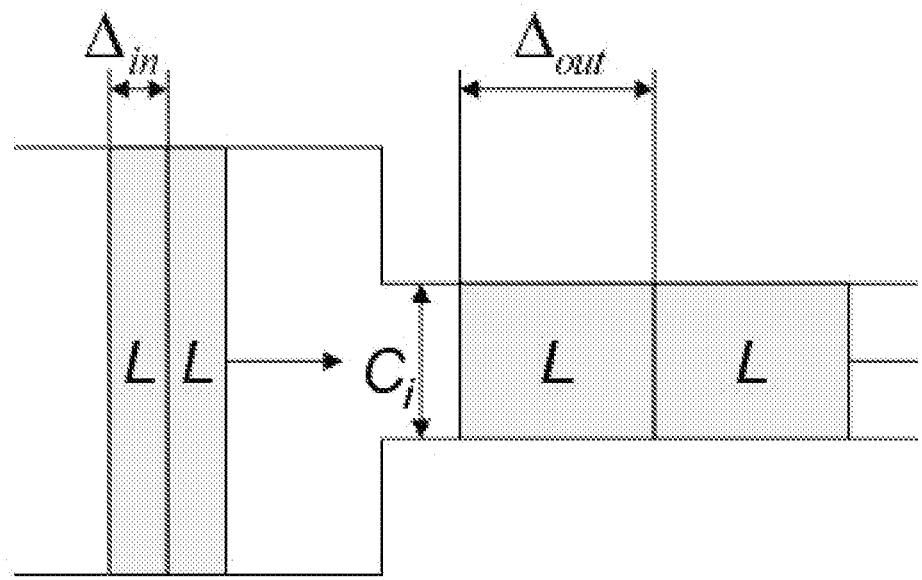
FIG. 2 is a diagram for describing a measurement principle of a general transmission bandwidth for helping understanding of the present invention.

FIG. 2 is a diagram for describing a measurement principle of a general transmission bandwidth for helping understanding of the present invention.

In FIG. 2, the sizes of two packets that are continuously sent to a receiver from a service are 'L', a transmission interval between two packets is 'in', and a reception interval between the two received packets in the receiver is 'out'.

At this time, a transmission bandwidth $C_i$ can be acquired as shown in Equation 1 below.

$$C_i = L/\Delta_{out} \quad \text{Equation 1}$$

Herein, the transmission bandwidth represents not an effective bandwidth but a transmissible bandwidth (capacity) of a mobile transmission network.

That is, according to Equation 1, the transmission bandwidth $C_i$ is calculated by dividing the sizes 'L' of two packets by the reception interval 'out' between two packets.

Figure 3:
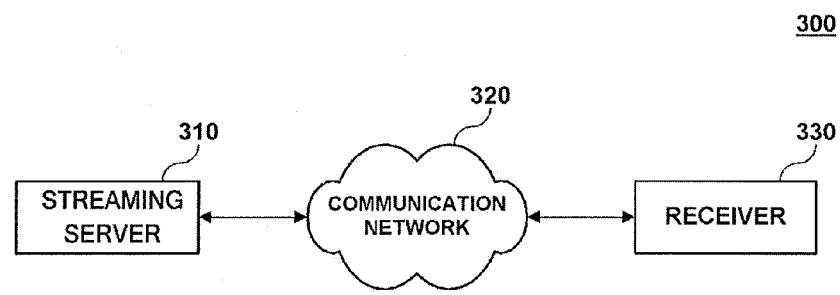
FIG. 3 is a configuration diagram schematically illustrating the configuration of a system for measuring a transmission bandwidth according to an embodiment of the present invention.

FIG. 3 is a configuration diagram schematically illustrating the configuration of a system for measuring a transmission bandwidth according to an embodiment of the present invention.

Referring to FIG. 3, the transmission bandwidth measuring system 300 according to the embodiment of the present invention includes a streaming server 310, a communication network 320, and a receiver 330.

The streaming server 310 possesses a plurality of media data including a plurality of kinds of moving pictures and streams media such as the moving picture, etc. to the receiver 330 in accordance with a media streaming request from the receiver 330.

Further, the streaming server 310 receives a time stamp of a received time receiving transmission data from the receiver 330 by transmitting the transmission data to the receiver 330 in a packet pair, calculates the transmission bandwidth on the basis of the time stamp of the received time, and streams the media to the receiver 330 by using the calculated transmission bandwidth.

In addition, the streaming server 310 stores a packet size of the transmission data and a time stamp of a transmitted time, which correspond to each packet.

In addition, the streaming server 310 calculates the transmission bandwidth by dividing the sizes of i-th two continuously sent packets by the reception interval between the two received packets and a final transmission bandwidth is acquired by taking a median a set of transmission bandwidth values measured between packet pairs in each cycle.

The communication network 320 provides a transmission path so as for the streaming server 310 to stream the media to the receiver 330 and in addition, the receiver 330 provides an access path for accessing the streaming server 310. Herein, the communication network 320 may be a wireless network such as a mobile communication network or a short-distance communication network and may be a wired network such as Internet, etc.

The receiver 330 receives the transmission data from the streaming server 310, records the time stamp of the received time for each packet of the received transmission data, and receives the media from the streaming server 310 through streaming after transmitting the time stamp of the received time recorded at a predetermined cycle to the streaming server 310.

Figure 4:
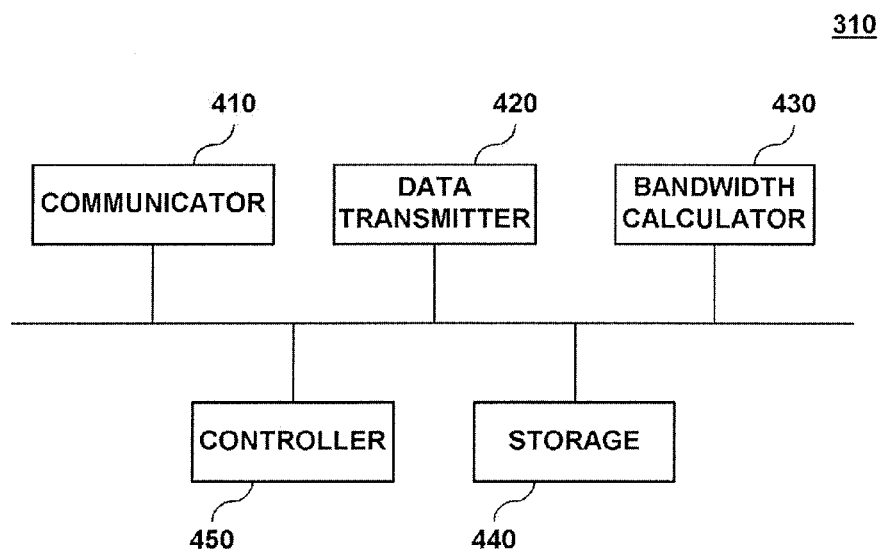
FIG. 4 is a configuration diagram schematically illustrating the internal configuration of a streaming server according to an embodiment of the present invention.

FIG. 4 is a configuration diagram schematically illustrating the internal configuration of a streaming server according to an embodiment of the present invention.

Referring to FIG. 4, the streaming server 110 according to the embodiment of the present invention includes a communicator 410, a data transmitter 420, a bandwidth calculator 430, a storage 440, and a controller 450.

The communicator 410 communicates with the receiver 330 through the communication network 320.

The data transmitter 420 transmits the transmission data to the receiver 330 in a packet pair.

The bandwidth calculator 430 calculates the transmission bandwidth on the basis of the time stamp of the received time received from the receiver 330.

At this time, the bandwidth calculator 430 calculates the transmission bandwidth by dividing the sizes $L_i$ of i-th two continuously sent packets by a reception interval $tr_{i+1}-tr_i$ between two packets received in the receiver 330.

In addition, the bandwidth calculator 430 acquires the final transmission bandwidth by taking the median for a set of the transmission bandwidth values measured between the packet pairs in each cycle.

The storage 440 stores the packet size of the transmission data transmitted to the receiver 330 and the time stamp of the transmitted time, which correspond to each packet.

The controller 450 transmits the transmission data through the data transmitter 420 in the packet pair, calculates the transmission bandwidth through the bandwidth calculator 430 on the basis of the time stamp of the received time received from the receiver 330, and controls to stream the media to the receiver 330 by using the calculated transmission bandwidth.

Figure 5:
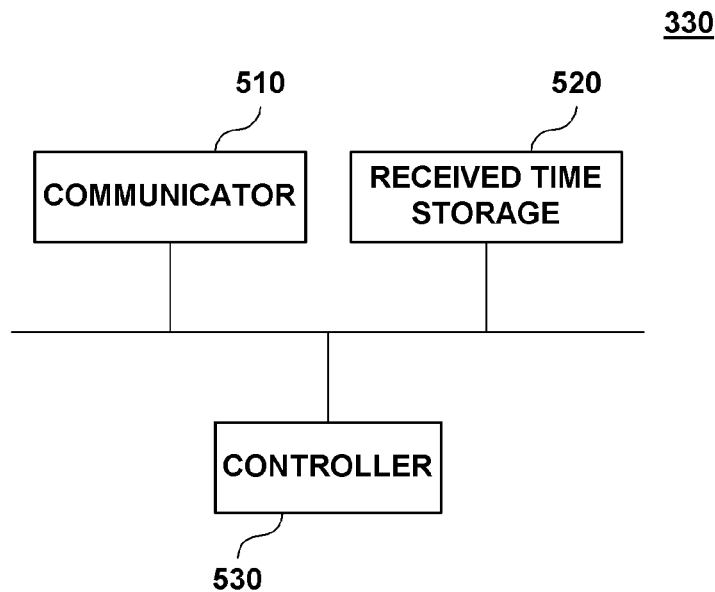
FIG. 5 is a configuration diagram schematically illustrating the internal configuration of a receiver according to an embodiment of the present invention.

FIG. 5 is a configuration diagram schematically illustrating the internal configuration of a receiver according to an embodiment of the present invention.

Referring to FIG. 5, the receiver 330 according to the embodiment of the present invention includes a communicator 510, a received time storage 520, and a controller 530.

The communicator 510 communicates with the streaming server 310 through the communication network 320.

The received time storage 520 records and stores the time stamp of the received time for each packet of the transmission data received from the streaming server 310.

The controller 530 controls to transmit the time stamp of the received time for each packet of the received transmission data to the streaming server 310 at a predetermined cycle.

In addition the controller 530 transmits the time stamp of the received time to the streaming server 310 at a predetermined cycle and thereafter, receives media transmitted by using the transmission bandwidth acquired based on the time stamp of the received time from the streaming server 310 through streaming.

Figure 6:
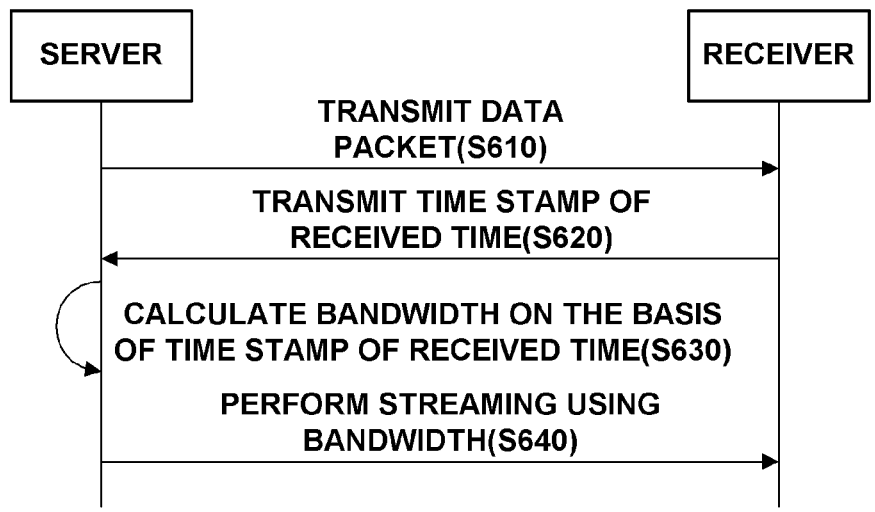
FIG. 6 is a flowchart for describing a method for measuring a transmission bandwidth according to an embodiment of the present invention.

FIG. 6 is a flowchart for describing a method for measuring a bandwidth according to an embodiment of the present invention.

Referring to FIG. 6, the streaming server 310 transmits the transmission data to the receiver 330 through the communication network 320 in the packet pair (S610).

The receiver 330 receives the transmission data and transmits the time stamp of the received time of the received transmission data to the streaming server 310 (S620).

At this time, the receiver 330 records the time stamp of the received time for each packet of the transmission data and transmits the time stamp recorded at the predetermined cycle to the streaming server 310.

The streaming server 310 receives the time stamp of the received time from the receiver 330 and calculates the transmission bandwidth on the basis of the time stamp of the received time (S630).

In addition, the streaming server 310 streams the media to the receiver 330 by using the transmission bandwidth (S640).

FIG. 7 is an operational flowchart for describing a method for measuring a bandwidth of a streaming server according to an embodiment of the present invention.

Referring to FIG. 7, the streaming server 310 transmits the transmission data to the receiver 330 (S710).

At this time, the streaming server 310 transmits the transmission data including the time stamp of the transmitted time of each packet to the receiver 330 and stores the packet size of the transmission data and the time stamp of the transmitted time for each packet, which correspond to each packet. Herein, since each packet has its own serial number, each packet is identifiable.

For example, the streaming server 310 stores the time stamp $ts_i$ of the transmitted time of an i-th packet and the time stamp $ts_{i+1}$ of the transmitted time of an i+1-th packet.

Subsequently, the streaming server 310 receives the time stamp of the received time of the transmission data from the receiver 330 (S720).

At this time, the streaming server 310 receives the time stamp of the received time of the transmission data from the receiver 330 at a predetermined cycle.

The streaming server 310 calculates the transmission bandwidth through the bandwidth calculator 430 on the basis of the time stamp of the received time (S730).

Herein, when the time stamp of the received time of the i-th packet is $tr_i$ and the time stamp of the received time of the i+1-th packet is $tr_{i+1}$, the streaming server 310 calculates the transmission bandwidth $C_i$ as shown in Equation 2.

$$C_i = L/\Delta_{out} \qquad \text{Equation 2}$$

As shown in Equation 2, the streaming server 310 calculates the transmission bandwidth by dividing the sizes L of the two transmitted packets by the time stamps of the received time of the two packets.

That is, the streaming server 310 calculates the transmission bandwidth by dividing the sizes $L_i$ of the two continuously sent i-th packets with respect to the transmission bandwidth by the reception interval $tr_{i+1}-tr_i$ between two packets received in the receiver 330.

In addition, the streaming server 310 acquires the final transmission bandwidth by taking the median for a set of the transmission bandwidth values measured between the packet pairs in each cycle.

In addition, the streaming server 310 streams the media to the receiver 330 by using the finally acquired transmission bandwidth (S740).

As described above, according to an embodiment of the present invention, it is possible to implement a system for measuring a transmission bandwidth for media streaming and a method thereof that are capable of calculating the transmission bandwidth by using a transmission packet to be transmitted to a receiver without transmitting a proving packet to the receiver and streaming media data to a receiver by using the transmission bandwidth in a service for streaming the media data such as a moving picture in real time.

While certain embodiments have been described above, it will be understood to those skilled in the art that the embodiments described are by way of example only. Accordingly, the device and method described herein should not be limited based on the described embodiments. Rather, the devices and methods described herein should only be limited in light of the claims that follow when taken in conjunction with the above description and accompanying drawings.

The present invention can be applied to a system that streams media data through a communication network.

Further, the present invention can be applied to even a system that requires variation of a bandwidth whenever streaming the media data.

In addition, the present invention can be applied to even a system that should provide a service satisfying a quality of service (QoS) at the time of streaming the media data to a plurality of terminals.

What is claimed is:

1. A system for measuring a transmission bandwidth, comprising:
   a server configured to transmit transmission data to a receiver in a packet pair and receives a time stamp of a received time when the transmission data is received from the receiver, to calculate the transmission bandwidth on the basis of the time stamp of the received time, and to stream media to the receiver by using the transmission bandwidth; and
   a receiver configured to receive the transmission data, to record the time stamp of the received time for each packet of the received transmission data, to transmit the time stamp of the received time, which is recorded at a predetermined cycle and thereafter, and to receive media from the server through streaming,
   wherein the transmission data is free of transmission time information.

2. The system for measuring a transmission bandwidth according to claim 1, wherein the server is configured to store a packet size and a time stamp of a transmitted time of the transmission data corresponding to each packet.

3. The system for measuring a transmission bandwidth according to claim 1, wherein the server is configured to calculate the transmission bandwidth by dividing the sizes Li of two continuously sent i-th packets by a reception interval $tr_{i+1}-tr_i$ between two packets received in the receiver.

4. The system for measuring a transmission bandwidth according to claim 3, wherein the server is configured to acquire a final transmission bandwidth by taking a median for a set of transmission bandwidth values measured between the packet pairs in each cycle.

5. A server, comprising:
   a communicator configured to communicate with a receiver;
   a data transmitter configured to transmit transmission data to the receiver in a packet pair;
   a bandwidth calculator configured to calculate the transmission bandwidth on the basis of a time stamp of a received time received from the receiver; and
   a controller configured to control to transmit the transmission data through the data transmitter in a packet pair, calculates the transmission bandwidth through the bandwidth calculator on the basis of the time stamp of the received time received from the receiver, and streams media to the receiver by using the calculated transmission bandwidth,
   wherein the transmission data is free of transmission time information.

6. The server according to claim 5, further comprising a storage configured to store a packet size and a time stamp of a transmitted time of the transmission data corresponding to each packet.

7. The server according to claim 5, wherein the bandwidth calculator is configured to calculate the transmission bandwidth by dividing the sizes Li of two continuously sent i-th packets by a reception interval $tr_{i+1}-tr_i$ between two packets received in the receiver.

8. The server according to claim 7, wherein the bandwidth calculator is configured to acquire a final transmission bandwidth by taking a median for a set of transmission bandwidth values measured between packet pairs in each cycle.

9. A receiver, comprising:
   a communicator for communicating with a server;
   a received time storage configured to record and store a time stamp of a received time for each packet of transmission data received from the server; and
   a controller configured to control to transmit the time stamp of the received time for each packet of the transmission data to the server at a predetermined cycle,
   wherein each packet of transmission data is free of transmission time information.

10. The receiver according to claim 9, wherein the controller is configured to transmit the time stamp of the received time to the server at the predetermined cycle and thereafter, to receive media transmitted from the server by using the transmission bandwidth acquired based on the time stamp of the received time through streaming.

11. A method for measuring a transmission bandwidth of a system including a server and a receiver, comprising:
(a) transmitting transmission data from the server to the receiver in a packet pair;
(b) receiving the transmission data at the receiver, wherein the transmission data is free of transmission time information;
(c) transmitting a time stamp of a received time of the transmission data from the receiver to the server;
(d) receiving the time stamp of the received time at the server;
(e) calculating the transmission bandwidth on the basis of the time stamp of the received time by the server; and
(f) streaming media from the server to the receiver by using the transmission bandwidth.

12. The method for measuring a transmission bandwidth according to claim 11, wherein at step (c), the receiver records the time stamp of the received time for each packet of the transmission data and transmits the time stamp of the received time recorded at a predetermined cycle to the server.

13. The method for measuring a transmission bandwidth according to claim 11, wherein at step (e), the server calculates the transmission bandwidth by dividing the sizes Li of two continuously sent i-th packets by a reception interval $tr_{i+1}-tr_i$ between two packets received in the receiver.

14. The method for measuring a transmission bandwidth according to claim 13, wherein at step (e), a final transmission bandwidth is acquired by taking a median for a set of transmission bandwidth values measured between the packet pairs in each cycle.

15. A method for measuring a transmission bandwidth of a server streaming media to a receiver by using the transmission bandwidth, comprising:
(a) transmitting transmission data to the receiver in a packet pair;
(b) receiving a time stamp of a received time of the transmission data from the receiver; and
(c) calculating the transmission bandwidth on the basis of the time stamp of the received time,
wherein the transmission data is free of transmission time information.

16. The method for measuring a transmission bandwidth according to claim 15, wherein at step (b), the time stamp of the received time of the transmission data is received from the receiver at a predetermined cycle.

17. The method for measuring a transmission bandwidth according to claim 15, wherein at step (c), the transmission bandwidth is calculated by dividing the sizes Li of two continuously sent i-th packets by a reception interval $tr_{i+1}-tr_i$ between two packets received in the receiver.

18. The method for measuring a transmission bandwidth according to claim 17, wherein at step (c), a final transmission bandwidth is acquired by taking a median for a set of transmission bandwidth values measured between the packet pairs in each cycle.

19. The method for measuring a transmission bandwidth according to claim 15, further comprising: (d) streaming media to the receiver by using the calculated transmission bandwidth.

* * * * *